May 5, 1931.  C. G. MINER  1,803,720
PROCESS OF PRODUCING NITRIDES OF ALUMINUM
OR MAGNESIUM FROM THEIR MINERALS
Filed July 6, 1926
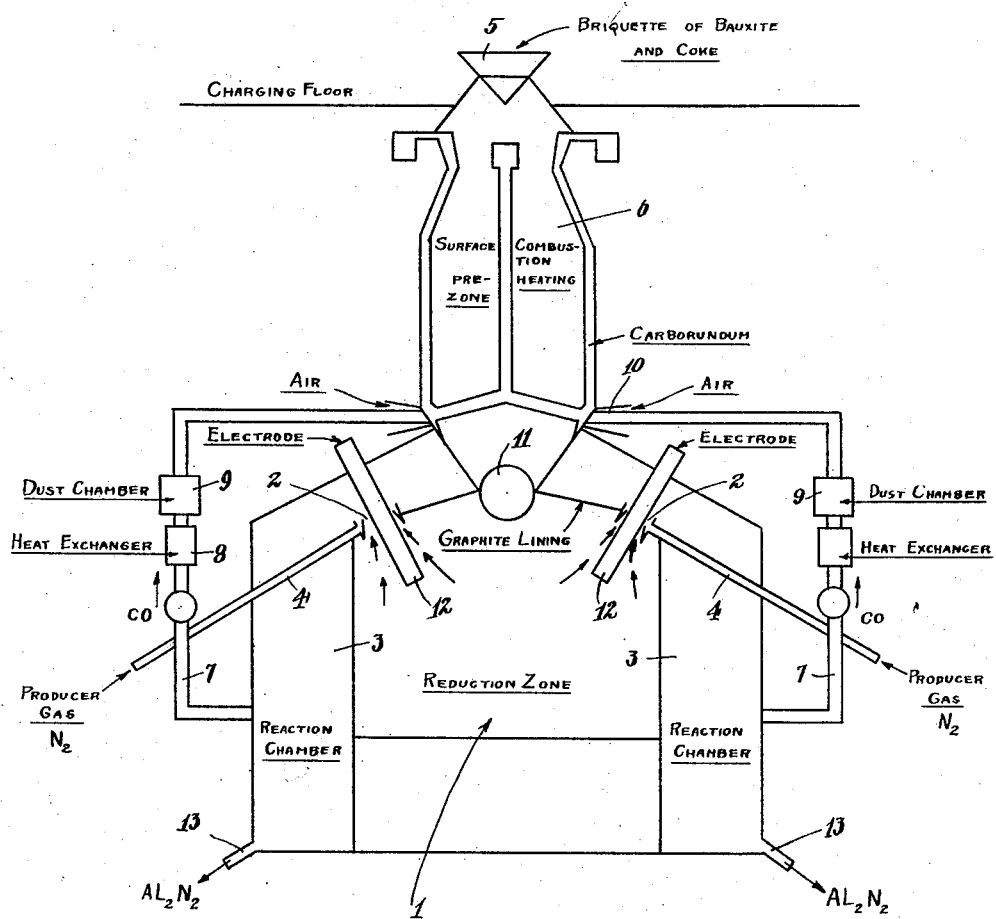
Inventor
Claude G. Miner
By Lyon & Lyon
Attorneys Patented May 5, 1931

1,803,720

UNITED STATES PATENT OFFICE

CLAUDE G. MINER, OF BERKELEY, CALIFORNIA

PROCESS OF PRODUCING NITRIDES OF ALUMINUM OR MAGNESIUM FROM THEIR MINERALS

Application filed July 6, 1926. Serial No. 120,633.

This invention relates to the production of aluminum and magnesium nitrides from their minerals.

The principal object of this invention is to provide a method or process of increased efficiency for the production of aluminum or magnesium nitride from their minerals.

Another object of this invention is to provide an apparatus for carrying out the process embodying this invention.

It is known that carbonaceous materials will reduce both the oxide of aluminum and magnesium. For the pure oxides of aluminum or magnesium, the active reduction temperature is approximately 2000° C. For the impure oxides, the reduction temperature is somewhat lower. For example, coke will reduce oxide and calcined magnesite at about 1800° C. For aluminum oxides, the reaction is:

1. $Al_2O_3 + 3C = Al_2 + 3CO$

For the magnesium oxides, the reaction is:

2. $MgO + C = Mg + CO$

If attempt is made to condense out the aluminum or magnesium produced according to the above reactions 1 and 2 by lowering the temperature of the resultant gases, then in each case, as is well known, the above reactions reverse to produce the original products. Reduction of the above oxides has been carried on and the resultant gases diluted with hydrogen, in which case as high as 90% aluminum and magnesium metal has been obtained.

In accordance with my present invention, I propose to reduce the oxides of the metals at approximately 1800° C. to 2200° C., although other temperatures without this range might be employed. In the case of the preparation of aluminum nitride, I propose to use bauxite alunite residue and other alumina bearing minerals, while in the case of the preparation of magnesium nitride, I propose to use calcined magnesite dolomite, or other magnesium ores.

After the minerals have been reduced in accordance with reactions 1 or 2, the resultant gases, without being allowed to cool to the reversal temperature, are brought into contact with nitrogen or a nitrogen carrying gas, such, for example, as producer gas. I have found that on allowing this mixture to cool, the nitride of the metal is formed.

In the accompanying drawing, I have illustrated diagrammatically one form of apparatus which may be employed for carrying out the process embodying this invention.

In this apparatus, reactions 1 or 2 are carried out in the reduction chamber or zone 1 and the metal in the vapor phase is carried out of the reduction zone 1 through outlets 2 into a reaction chamber 3. The resultant carbon gases formed during the carrying out of reactions 1 and 2 pass with the metal in the vapor phase through the outlets 2 into the reaction chamber 3. A nitrogen bearing gas is introduced into the gases as the same pass from the reduction zone 1 into the reaction chamber 3, care being taken not to introduce the nitrogen bearing gas into the reduction zone 1, but the nitrogen bearing gas is not introduced into the gaseous products, produced in accordance with reactions 1 or 2 in the reaction zone 1, until the said gases pass into the reaction chamber 3.

The reaction chamber 3 is at a lower temperature than the reduction zone 1. If the gaseous products produced into the reduction zone 1 are mixed with the nitrogen bearing gas, as illustrated in the drawings, no specific temperature is required in the reaction chamber. The reaction between the nitrogen and the metal in the metallic phase is exothermic and the temperature in the reaction chamber is maintained by the heat produced by the reaction between the metal and the nitrogen. These reactions may be illustrated as:

3. $Al_2 + 3CO + N_2 + .52CO = Al_2N_2 + 3.52CO$
4. $6Mg + 6CO + 2N_2 + 1.04CO = 2Mg_3N_2 + 7.04CO$

Reactions 3 and 4 may be the reactions which take place when producer gas is introduced into the reaction chamber through the conduits 4.

It is preferable that the reaction chamber 3 be formed surrounding the reduction zone 1 so that the heat of the reaction between the metal in the vapor phase produced in the reduction zone 1 with the nitrogen introduced into the reaction chamber aids in maintaining the requisite temperature in the reduction zone 1. This utilization of heat of reaction it is believed will enable the nitrides of aluminum and magnesium to be produced commercially.

The apparatus diagrammatically illustrated in the drawings is applicable for the production of either aluminum nitride or magnesium nitride and will be described in connection with the production or its application to the production of aluminum nitride.

Briquets formed of ground bauxite and coke, or other aluminum bearing minerals and coke, is introduced through a hopper 5 into a surface pre-combustion and pre-heating zone 6 where the briquets are pre-heated by the waste gases which pass from the reduction zone 1. During this pre-heating, surface combustion of the briquets takes place, due to the raised temperature thereof.

In order to support and maintain this combustion within the surface combustion and pre-heating zone 6, the carbon gases produced within the reduction chamber 1, after the same have been conducted to the reaction chamber 3, are conveyed through a conduit 7 through a heat-exchanger 8 and dust collecting chamber 9 into the zone 6 and air is introduced into the zone 6 through the inlet 10. The air and carbon gases are burned within the zone 6. The pre-heated mineral passes from the zone 6 into the reduction zone 1 on the withdrawing from the lower end of the zone 6 of a graphite or like material plug 11. Electrodes 12, connected with any suitable or desirable source of electric current, extend into the reduction zone 1 for the purpose of maintaining the required temperature within the reduction zone 1. The aluminum metal formed during the reduction of the alumina bearing mineral within the reduction zone 1 vaporizes and passes through the outlet 2 into the reaction chamber 3 with the carbonaceous gases produced during the reaction 1. Producer gas or a similar nitrogen containing gas is introduced into the gaseous products through the conduit 4 and the reaction takes place in the reaction chamber 3 and aluminum nitride is drawn off through the outlets 13. The carbon gases, as before described, are conducted in the reaction chamber 3 through the conduit 7. The dust that tends to pass with the gases from the reaction chamber 3 is collected in the dust chamber 9 and the heat of the gases passing from the reaction chamber 3 may be utilized in a heat exchanger 8 for the pre-heating of the air introduced through the inlet 10 or for the pre-heating of the briquets or alumina bearing mineral and coke which is introduced into the apparatus through the chamber 5 or may be utilized in any other manner desired.

The gases produced in accordance with reaction 1 or 2 in the reduction zone 1 are allowed to escape around the electrodes 12 so that they will not cool to the reversal temperature which is somewhat below 1800° C.

Having fully described the preferred embodiment of my invention, it is to be understood that I do not wish to be limited to the exact details herein set forth, which may obviously be varied without departing from the spirit of my invention as set forth in the appended claims.

I claim:

1. A process of producing metallic nitrides which comprises reducing the metallic oxide to the metal in a reducing zone at the volatilization temperature of the metal, conducting the vaporized metal and resultant gases from the reducing zone to a reaction zone apart from the reducing zone, and mixing a nitrogen-bearing gas with the vaporized metal in the reaction zone to produce the metallic nitride.

2. A process of producing metallic nitrides which comprises reducing the metallic oxide to produce a vapor of the metal, conducting the vaporized metal from the reducing zone and then mixing a nitrogen-bearing gas with the vaporized metal and allowing the mixture to cool.

3. A process of producing metallic nitrides which comprises reducing the metallic oxide to the metal in a reducing zone at the volatilization temperature of the metal, conducting the vaporized metal and resultant gases from the reducing zone into a reaction zone apart from the reducing zone, and introducing a nitrogen-bearing gas of a reducing character into the reaction zone to react with the vaporized metal to produce the metallic nitride.

4. A process of producing metallic nitrides which comprises reducing the metallic oxide to the metal in a reducing zone, conducting the vaporized metal and resultant gases from the reducing zone to a reaction zone apart from the reducing zone, mixing the nitrogen-bearing gas with the vaporized metal so that the nitrogen and the vaporized metal react at a temperature lower than that existing in the reducing zone but at a temperature higher than the temperature at which the reaction between the metal and the reducing agent will reverse to produce the metallic oxide.

5. A process of producing aluminum nitride which comprises reducing aluminum oxide to the metal in a reducing zone at the volatilization temperature of the aluminum, conducting the vaporized aluminum and resultant gases from the reducing zone to a reaction zone apart from a reducing zone and introducing a nitrogen-bearing gas of reducing character into the reaction zone to react with the vaporized aluminum to produce aluminum nitride.

Signed at San Francisco this 16 day of June, 1926.

CLAUDE G. MINER.